US007657097B2

(12) United States Patent
Silic

(10) Patent No.: US 7,657,097 B2
(45) Date of Patent: Feb. 2, 2010

(54) PICTURE REPRODUCTION SYSTEM AND METHOD UTILIZING INDEPENDENT PICTURE ELEMENTS

(75) Inventor: Bojan Silic, San Jose, CA (US)

(73) Assignee: Silicon Constellations, Inc., San Jose, CA (US)

( * ) Notice: Subject to any disclaimer, the term of this patent is extended or adjusted under 35 U.S.C. 154(b) by 1198 days.

(21) Appl. No.: 10/349,402

(22) Filed: Jan. 21, 2003

(65) Prior Publication Data

US 2003/0160739 A1 Aug. 28, 2003

Related U.S. Application Data

(60) Provisional application No. 60/351,765, filed on Jan. 24, 2002.

(51) Int. Cl.
*G06K 9/66* (2006.01)

(52) U.S. Cl. .................... 382/194; 257/88; 340/815.45; 345/31; 345/46; 345/48

(58) Field of Classification Search ................... 345/30, 345/39, 82, 31, 46, 48; 348/587, 656, 744, 348/756; 382/194; 257/88; 340/815.45
See application file for complete search history.

(56) References Cited

U.S. PATENT DOCUMENTS 5,057,827 A * 10/1991 Nobile et al. ................. 345/31
5,796,376 A * 8/1998 Banks ......................... 345/82
6,023,255 A * 2/2000 Bell ............................ 345/46
6,238,051 B1 * 5/2001 Huang ......................... 353/81
6,239,774 B1 * 5/2001 Altman ........................ 345/31
6,265,984 B1 * 7/2001 Molinaroli ............... 340/815.4
6,400,417 B1 * 6/2002 Hall et al. ................... 348/656
6,490,006 B1 * 12/2002 Monjo ........................ 348/587
6,600,276 B2 * 7/2003 Lee ....................... 315/368.11
6,617,648 B1 * 9/2003 Yamazaki et al. ........... 257/350
6,621,530 B1 * 9/2003 Hall et al. ................... 348/781
6,639,631 B1 * 10/2003 Hall et al. ................... 348/744
6,669,346 B2 * 12/2003 Metcalf ....................... 353/94
6,717,626 B1 * 4/2004 Kondo et al. ................ 348/756
6,728,031 B2 * 4/2004 Hirata et al. ................ 359/457
6,822,795 B2 * 11/2004 Lai ............................ 359/567
6,856,303 B2 * 2/2005 Kowalewski ................. 345/31
7,030,420 B2 * 4/2006 Shimomura et al. ........... 257/88
7,142,173 B2 * 11/2006 Bentley ....................... 345/31
2003/0160739 A1 * 8/2003 Silic ............................ 345/30

* cited by examiner

*Primary Examiner*—Gregory M Desire
(74) *Attorney, Agent, or Firm*—DLA Piper LLP (US)

(57) ABSTRACT

A system and method of producing an image using a plurality of independent pixel devices, each of which includes one or more light emitting or polarizing elements. The pixel devices are fixed (e.g. on the side of a building) or are moving (e.g. on water or falling in air) within an image space in which an image is to be formed. A controller determines, based upon the locations of the pixel devices within the image space, what portion of the image each pixel device is to reproduce, and then commands the pixel devices to use the emitting devices to reproduce the corresponding portion of the image. As the pixel devices move, the new locations of the pixel devices are mapped onto the image, and the control of the pixel devices is modified accordingly so that the image produced by the pixel devices is not distorted by their movement.

17 Claims, 4 Drawing Sheets

PICTURE REPRODUCTION SYSTEM AND METHOD UTILIZING INDEPENDENT PICTURE ELEMENTS

This application claims the benefit of U.S. Provisional Application No. 60/351,765, filed Jan. 24, 2002 and entitled PICTURE REPRODUCTION METHOD UTILIZING INDEPENDENT PICTURE ELEMENTS.

FIELD OF THE INVENTION

The present invention relates to methods and systems for creating images and motion pictures using independent picture elements. More particularly, the system and method of the present invention can be used for movie theaters, active electronic billboards, fireworks in the sky, advertising signs, light shows for parties and concerts, special lighting effects, and interior/exterior decorations.

BACKGROUND OF THE INVENTION

Present day devices and systems for image and motion picture reproduction include many different types: projectors and projection screens, cathode ray tubes (CRT), liquid crystal displays (LCD), and light emitting diode (LED) grid arrays in the form of active billboards.

All of these devices and systems require a predetermined surface to be secured where the images and motion pictures will appear. This surface, which is usually called a screen, is in most cases a continuous, solid object. Because of that, its size is often dictated by the available space and technical realization issues. For many applications, it is desirable that the screen surface area be as large as possible. The capability of a billboard, for example, to capture one's attention is directly proportional to its size.

Furthermore, the brightness of the display will dictate the operational duty cycle on any given day. It is for this reason that conventional outdoor projection systems have a low operational duty cycle (i.e. they are usable only in low light conditions such as during the night time). LED grid arrays are much more effective in being visible even when the sunlight level is at its maximum. Both projection and LED based systems have their drawbacks relating to outdoor screen mounting issues. A projection system could use a building facade as its screen. However, in many cases, it is impossible to project an image onto a building that is occupied. In downtown areas which are crowded with hotels, such as Las Vegas, a majority of the high rising buildings are occupied. Thus, the occupants would be bothered by intense light directed at the building and, at best, the show would have to be limited in both length and how late at night the show could last. Also, a building facade that is mostly covered with windows doesn't make for an optimal projection screen because of the irregularities in its surface and the not so favorable light reflection coefficient of the glass windows. The solution for the surface smoothness would be to cover the building facade with an actual projection screen. This is not desirable because it would completely block the view for the occupants of that building.

Large dynamic LED grid screens face the same problem. They are enclosed in a large, panel shaped, solid object which could weigh thousands of pounds. The mounting requirements for such a device are very stringent which makes them unsuitable for the temporary applications. Permanent mounting of a large panel LED display onto a hotel facade would mean a permanent obstruction of view for the guests.

SUMMARY OF THE INVENTION

The present invention solves the aforementioned problems by providing a picture reproduction system and method that can produce large images in an image space using discrete pixel devices, even when the pixel devices are moving within the image space.

The image reproduction system of the present invention includes a plurality of pixel devices that are individually placeable into an image space, with each of the pixel devices including at least one light emitting element, and a controller for determining the locations of the pixel devices within the image space and for individually controlling the pixel devices based upon the determined locations to generate an image using the light emitting elements.

In another aspect of the present invention, a method of producing an image in an image space includes placing a plurality of pixel devices into an image space, wherein each of the pixel devices includes at least one light emitting element, determining the locations of the pixel devices within the image space, and controlling the pixel devices based upon the determined locations to generate an image using the light emitting elements.

Other objects and features of the present invention will become apparent by a review of the specification, claims and appended figures.

DETAILED DESCRIPTION OF THE PREFERRED EMBODIMENTS

Figure 1:
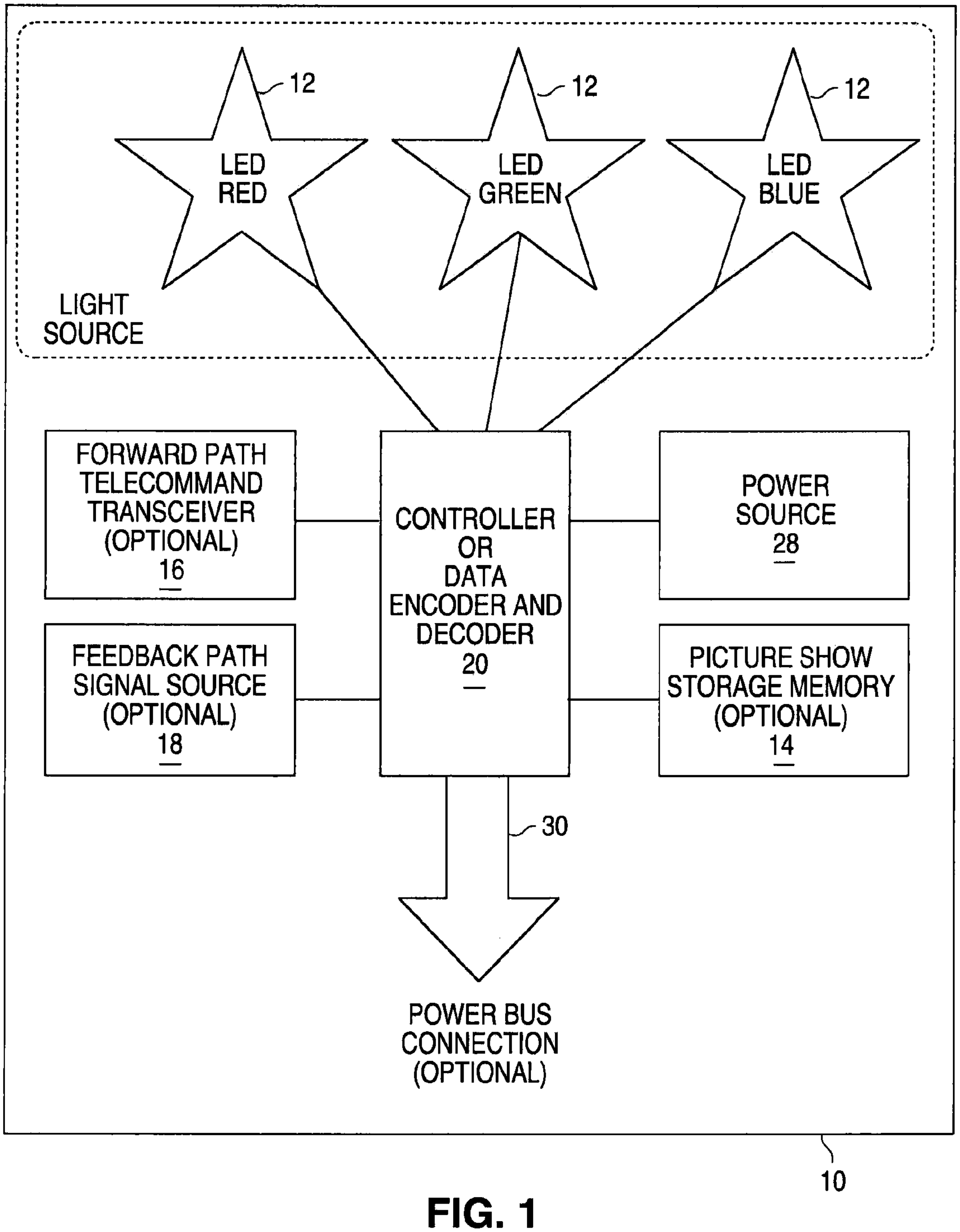
FIG. 1 is a diagram of the components in the pixel device of the present invention.

The present invention is a unique picture reproduction system and method, as illustrated in FIGS. 1-4. In this system and method, pictures are created with a plurality of independent picture elements 10 (pixel devices), one of which is shown in FIG. 1. Each independent pixel device 10 includes one or more light emitting or polarizing elements 12 (such as light emitting diodes, incandescent lamps, neon bulbs, lasers, liquid crystal displays, etc.) that form the equivalent of a pixel on the CRT screen or on the dynamic LED panel display. Each pixel device 10 can also include memory 14 for storing pixel information, a transceiver 16 and/or feedback path signal source 18 for receiving and/or sending data to a central controller and/or for determining location, and a controller 20 for operating the components of the pixel device 10. The system of the present invention would include a plurality of such devices, that preferably are not physically connected to each other. The pixel devices 10 can be embodied each in their own enclosure and that way deployed over any surface thereby effectively transforming that surface into a picture screen. Any of the pixel devices 10 can assume the role of projecting any part of the picture image. This enables the construction of dynamic grid displays in any location imaginable. It would be possible, for example, to turn a whole skyscraper into a large movie screen using a plurality of pixel devices 10 strategically mounted to the skyscraper. For example, one or more of the independent pixel devices 10 can be placed in or near each window of the building. Occupants of that building would not be bothered by the independent pixel devices 10 as the light produced therefrom is directed out away from the building. At the same time, these independent pixel devices 10 are small modules and as such would not be obstructing the view through the window and would not detract from the look of the building in the day time. Their size is chosen to provide enough light output for a desired viewing distance. Furthermore, the pixel devices 10 may be located in any location, or may move, while displaying a static or dynamic image or images.

In one embodiment, the system of the present invention includes a plurality of independent pixel devices 10 each having a light source and an electronic circuit for smart control. An electronic circuit (either contained locally in the pixel device 10 or embodied in a central controller) would be used for determining the pixel device's relative location within the picture grid and the storage of the desired picture content. Once such a system is deployed in a plane (two dimensional application), or space in general (three dimensional application), independent pixel devices 10 would be able to, on their own or with help from a more central device, determine which part of the image they are occupying based upon their detected location, and would therefore automatically activate their light sources in the appropriate color pattern over the period of time based upon their location within the projected image. When viewed from a distance they would appear synchronized and would form a complete image or a motion picture.

Figure 2:
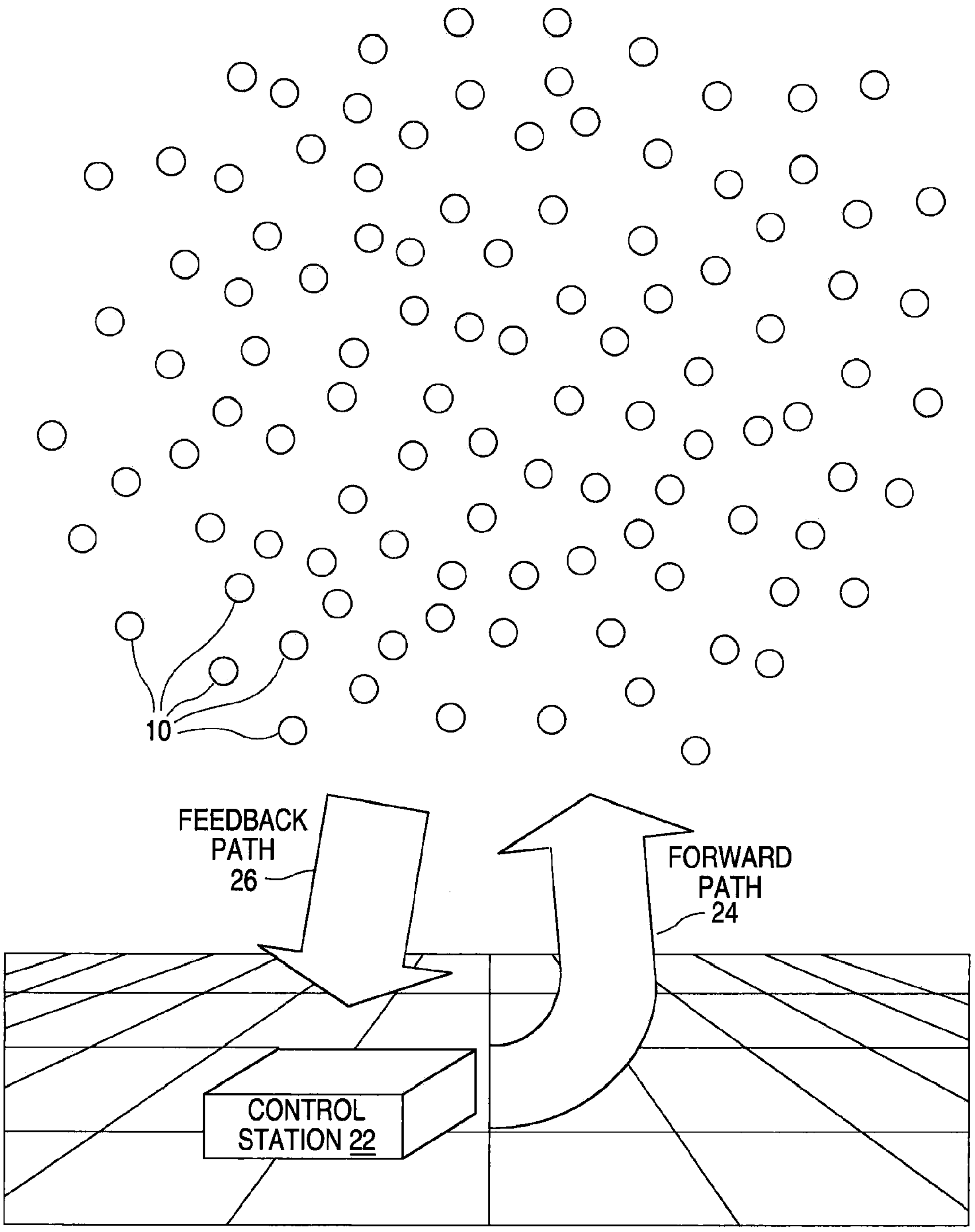
FIG. 2 is a diagram showing the components of the picture reproduction system of the present invention.

This same effect is realized more cost effectively in another embodiment where the electronic circuitry within the independent pixel device 10 only has a capability for reception of commands and activation of the light sources 12 within. Commands would contain but not be limited to light color and intensity information that each pixel device 10 shall display. Independent pixel devices 10 are commanded from a central control station 22 via a remote control channel 24, which is referred to herein as a "forward path", as shown in FIG. 2. Forward path 24 is used to deliver the desired image content to the plurality of independent pixel devices 10 as well as for the control during the process of their location determination. This process of independent pixel device location determination is referred to as "the mapping process".

Forward path 24 preferably utilizes a wireless link implemented in the radio or infrared spectrum. For this purpose each independent pixel device 10 has a radio or infrared receiver or transceiver 16. Commands are modulated onto the radio frequency or infrared carrier and sent to the independent pixel devices 10 by the central control station 22. A multiple of the wireless links could be used at the same time to increase the command throughput of the forward path 24. During the mapping process, independent pixel devices 10 are associated with their respective two or three dimensional coordinates. For more permanent pixel device installations, the forward path 24 could utilize electrical wires.

Figure 3:
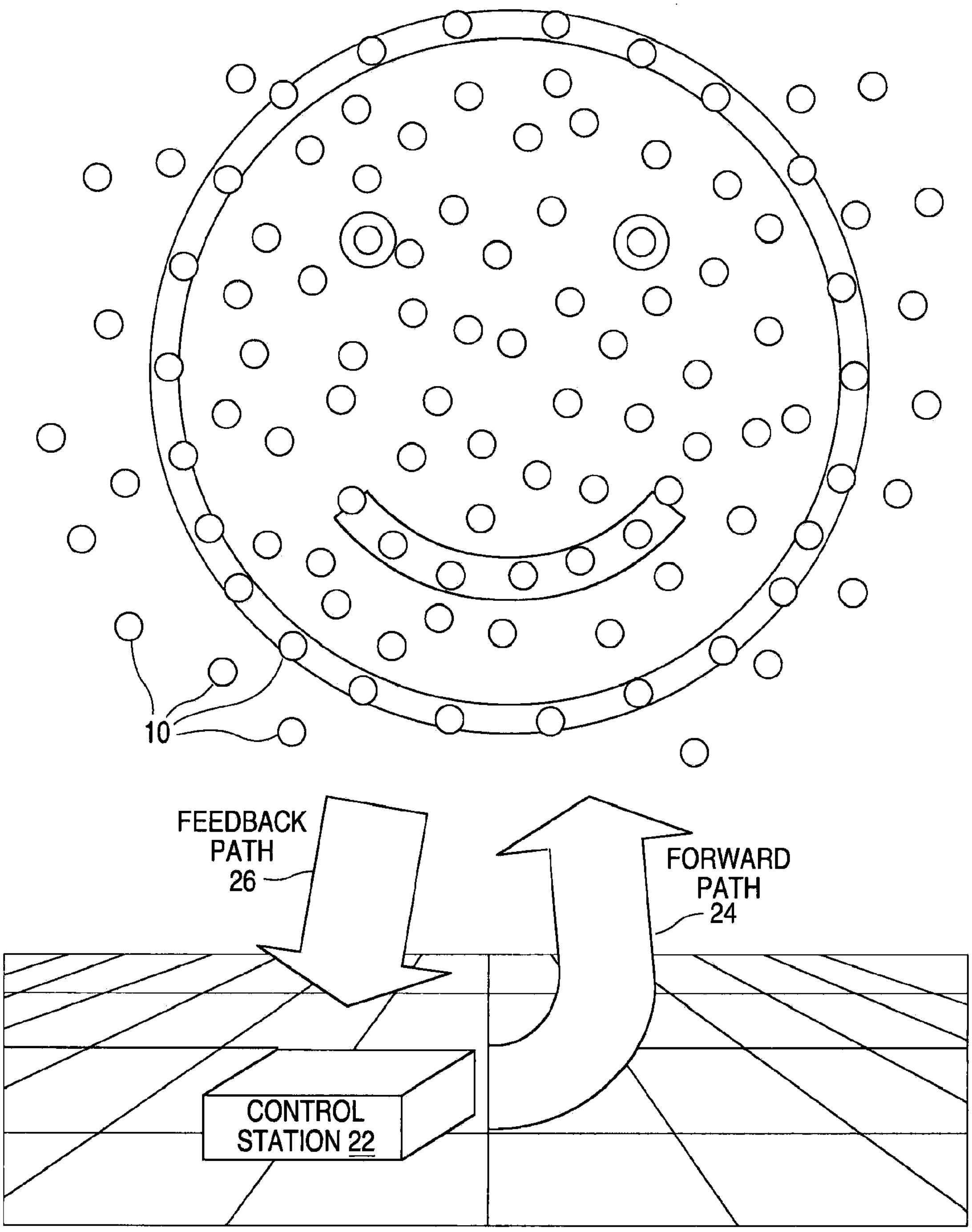
FIG. 3 is a diagram of the picture reproduction system of the present invention, with the desired image mapped onto the pixel devices dispersed in the image space.
Figure 4:
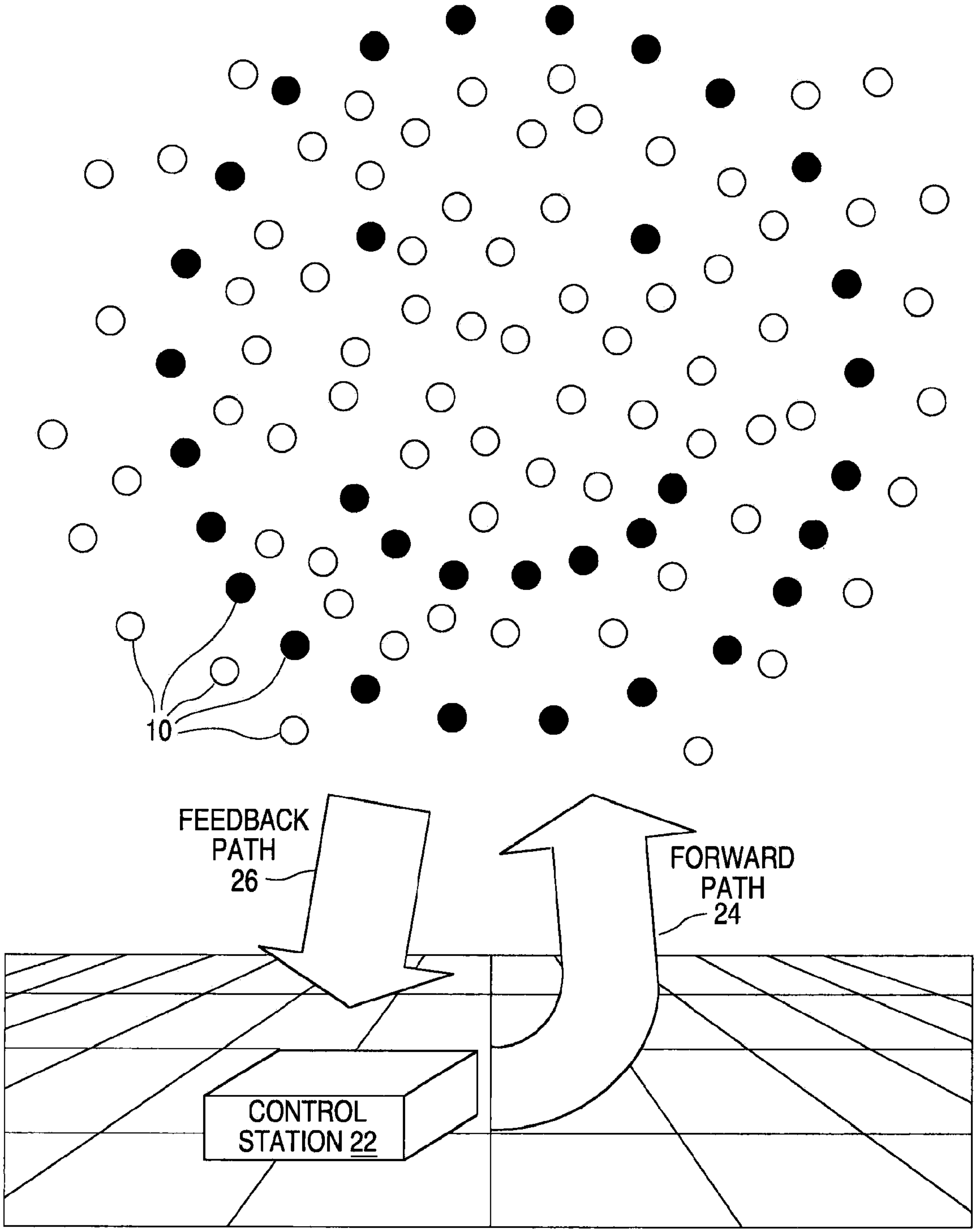
FIG. 4 is a diagram of the picture reproduction system of the present invention, with the pixel devices generating the desired image.

Each independent pixel device 10 may have a unique digital address. The set of address and coordinate pairs for the pixel devices 10 may now represent a picture grid. The desired picture is normalized to the size of this grid in software running on the central control station 22. Once the picture is fitted into this grid as shown in FIG. 3, the control station 22 issues commands to the independent pixel devices 10 activating their light sources 12 in the appropriate color pattern to recreate the given image, as shown in FIG. 4. For motion pictures, this process repeats and pictures are produced rapidly one after the other just like a television screen. The mapping process can run repeatedly and independently of the picture playback process in order to always provide the system with the most current position of the independent pixel devices. This is useful in those applications where independent pixel devices 10 are not stationary with respect to each other or with respect to the viewers. It is necessary to do this repeatedly for non-stationary pixel devices 10 because a pixel device that is moving across the picture field has to be assigned to a different portion of the image (different color or light intensity level) as its coordinates are changing. Otherwise, the picture could become distorted and loose its integrity. One such application is a picture screen in the sky or on the water surface.

In order to acquire the position information for each independent pixel device, the control station 22 uses a predetermined set of coordinates (for stationary pixel devices) or a feedback path 26 using the feedback path signal source 18 (for moveable pixel devices). In a stationary application, the coordinates are predetermined prior to the pixel device mounting. Then, the independent pixel devices 10 would be mounted onto the surface in the predetermined order.

In cases where the pixel devices 10 could not be mounted in the predetermined order or in the cases where they are free to move, their locations are discovered after mounting or deployment. There are several ways to detect the position of movable pixel devices 10 while these devices are actively displaying image portions from their light emitters. One way is for each pixel device to contain circuitry to independently determine locations, such as GPS. Another way is for the control station 22 to sense beacon patterns that are coming from each independent pixel device 10. Specifically, the feedback path signal source can include a beacon mechanism implemented in the radio frequency, or in the infrared or visible light spectrum. This functionality is called "the feedback path" 26. Beacons are triggered either by the commands that are coming from the central control station 22 or by the electronic control circuitry (e.g. controller 20) of the independent pixel device 10. Beacon signals which are using radio frequencies are picked up by antenna and radio receiver systems in the central control station 22 and the location of each pixel device 10 is determined through the process of triangulation and direction finding. Yet another way to determine location is for the beacon signals to be incorporated in the light output from the pixel device light sources 12 themselves. In this case, the central control station 10 is equipped with a camera that monitors the image pattern produced by the pixel devices 10. The image pattern (i.e. the desired picture produced by the array of pixel devices 10) is digitized, and the location information for each independent pixel device is extracted from the digitized image. The beacon signals can be separate from the actual visible image created by the pixel devices 10 (i.e. infrared), or the beacon signals can be in the visible light spectrum where the independent pixel devices 10 utilize the same light sources which are used for the picture recreation for location determination. In the latter case, the actual visible image created by the pixel devices 10 is used to detect when a pixel device moves (thus distorting the image) and to modify its output (to correct the image distortion).

Electrical energy is provided to each independent pixel device 10 from a power source 28, which can include a battery pack or a separate power supply, or from a connection to a power bus 30.

With the present invention, the pixel devices 10 need not be fixed or arranged in an evenly distributed grid. This flexibility allows for a picture screen to be built in locations never before possible. For example, the audience at the stadium can be transformed into a picture screen. Pixel devices can be produced in the shape of a key chain and given to the audience as souvenirs. After the audience enters the stadium and take their seats, the announcer asks everyone to raise their key chains in the air. At this moment the system activates the light sources inside of the key chains. The digital camera in the control station 10 takes pictures of the audience. From its digitized image, the control station 10 extracts the information about the location of each individual pixel device. This forms a grid of randomly distributed pixel devices 10. An image stored or otherwise supplied to the control station 10 is normalized to the size of the grid. The control station 10 overlays the image onto the grid and identifies the role of the each pixel device 10 in the image. Information about light color and intensity is sent to the pixel devices 10 through the forward path 24. Pixel devices 10 activate their light sources 12 accordingly upon the reception of the commands. The image now appears from the audience. If anyone in the audience decides to move, thereby changing the location of that particular pixel device 10 within the image, the feedback path 26 (i.e. digital camera or radio receiver) is able to detect the movement and the new location of the pixel device 10. The grid map is updated with the current location information for the pixel devices 10. Those pixel devices 10 which have moved are now assigned to reproduce a different portion of the image. New assignments are again sent through the forward path 24. This closes the image distortion correction loop.

Similarly, the independent pixel devices 10 can be used to create images and motion pictures in the sky. For example, a large number of wireless pixel devices deployed in a dark sky can form a picture field of any desired size. Conventional fireworks launchers or aircraft can be used for their deployment. Pixel devices are deployed in a cloud like formation where their individual locations are random and initially unknown. The wireless control station 10 on the ground keeps track of their locations using the feedback path 26. Only those pixels that need to be a part of the picture are activated. Because the pixel devices 10 are free falling and are carried by the wind, their location within the image field is constantly changing. For this reason it is necessary to have the image distortion correction loop in place. Some of the pixel devices 10 may have to assume different parts of the image as they are moving. Others might travel out of the image field in which case their light sources are completely deactivated, until they again enter the area occupied by the image.

It is to be understood that the present invention is not limited to the embodiment(s) described above and illustrated herein, but encompasses any and all variations falling within the scope of the appended claims.

What is claimed is:

1. An image reproduction system, comprising:

a plurality of pixel devices that are individually placeable into an image space, each of the pixel devices including:

at least one light emitting element, and a feedback signal source configured to send information about a location of the pixel device; and a controller configured to receive the information sent by the pixel devices, to determine the locations of the pixel devices within the image space using the received information, and to individually control the pixel devices based upon the determined locations to generate an image using the light emitting elements.

2. The image reproduction system of claim 1, wherein each one of the pixel devices includes:

a memory for storing pixel image information; and a control device for operating the at least one light emitting element in the one pixel device based upon the stored pixel image information.

3. The image reproduction system of claim 1, wherein each one of the pixel devices includes:

a forward path receiver for receiving commands from the controller used to operate the at least one light emitting element in the one pixel device.

4. The image reproduction system of claim 1, further comprising:

a camera for monitoring the image generated by the light emitting elements, wherein the control of the pixel devices is responsive to the image monitored by the camera.

5. The image reproduction system of claim 1, wherein for each of the pixel devices, the feedback signal source comprises a GPS device for generating the information about the location of the pixel device.

6. The image reproduction system of claim 1, wherein for each of the pixel devices, the feedback signal source is configured to generate an RF or an infrared beacon signal for sending the information about the location of the pixel device.

7. The image reproduction system of claim 6, wherein the controller is configured to determine the locations of the pixel devices by triangulation or direction finding of the beacon signals.

8. The image reproduction system of claim 1, wherein the controller is configured to determine one of the pixel devices has moved relative to another of the pixel devices, and to control the one pixel device based upon the determined movement.

9. A method of producing an image in an image space, comprising:

placing a plurality of pixel devices individually into an image space, wherein each of the pixel devices includes at least one light emitting element;

for each of the pixel devices, sending information about a location of the pixel device from the pixel device to a controller;

determining the locations of the pixel devices within the image space using the controller and the information sent to the controller; and controlling the pixel devices using the controller based upon the determined locations to generate an image using the light emitting elements.

10. The method of claim 9, wherein the pixel device control further includes:

mapping an image pattern over the determined locations of the pixel devices; and controlling each one of the pixel devices to produce that portion of the image pattern mapped thereto using the at least one light emitting element in the one pixel device.

11. The method of claim 9, wherein the location determination for each one of the pixel devices includes:

detecting a beacon signal from the one pixel device representing location information for the one pixel device.

12. The method of claim 11, wherein the beacon signals are generated by the light emitting elements.

13. The method of claim 9, further comprising:

monitoring the image generated by the light emitting elements; and modifying the control of the pixel devices in response to the monitored image.

14. The method of claim 6, further comprising:

moving at least one of the pixel devices relative to another of the pixel devices;

detecting the movement of the one pixel device using the controller; and modifying the control of the one pixel device in response to the detected movement of the one pixel device.

15. The method of claim 9, wherein each of the pixel devices further comprises a GPS device, and wherein the method further comprising:

for each of the pixel devices, generating the information about the location of the pixel device using the GPS device.

16. The method of claim 9, wherein for each of the pixel devices, the sending of the information comprises sending the information as an RF or an infrared beacon signal.

17. The method of claim 16, wherein the determining of the locations of the pixel devices comprises triangulating or direction finding the beacon signals.

* * * * *